United States Patent
Clarke et al.

(10) Patent No.: US 6,912,407 B1
(45) Date of Patent: Jun. 28, 2005

(54) PORTABLE DEVICE FOR STORING AND SEARCHING TELEPHONE LISTINGS, AND METHOD AND COMPUTER PROGRAM PRODUCT FOR TRANSMITTING TELEPHONE INFORMATION TO A PORTABLE DEVICE

(76) Inventors: Susan Lee Clarke, 568 Harbor Colony Ct., Redwood Shores, CA (US) 94065; Guy Anthony Clarke, 568 Harbor Colony Ct., Redwood Shores, CA (US) 94065; Steven Charles Boler, 2266 Airport Blvd., Santa Rosa, CA (US) 95403; Michael James Boler, 4145 Shadow La., #429, Santa Rosa, CA (US) 95403

(*) Notice: Subject to any disclaimer, the term of this patent is extended or adjusted under 35 U.S.C. 154(b) by 337 days.

(21) Appl. No.: 10/012,892

(22) Filed: Nov. 3, 2001

(51) Int. Cl.[7] .............................................. H04M 1/00
(52) U.S. Cl. ................... 455/556.2; 455/412.1; 707/102; 379/93.23
(58) Field of Search ................... 455/556.2, 412.1; 707/102; 379/93.23

(56) References Cited

U.S. PATENT DOCUMENTS

| | | | |
|---|---|---|---|
| 5,943,055 A | * 8/1999 | Sylvan | 345/839 |
| 6,338,068 B1 | * 1/2002 | Moore et al. | 707/102 |
| 6,370,282 B1 | * 4/2002 | Pavley et al. | 382/311 |
| 6,594,142 B2 | * 7/2003 | Katz | 361/680 |
| 6,691,123 B1 | * 2/2004 | Gulliksen | 707/101 |
| 2001/0018703 A1 | * 8/2001 | Miyazawa et al. | |
| 2002/0156779 A1 | * 10/2002 | Elliott et al. | |

* cited by examiner

Primary Examiner—Roland G. Foster
Assistant Examiner—Simon P. Sing
(74) Attorney, Agent, or Firm—Zilka-Kotab, PC

(57) ABSTRACT

A portable device having telephone information stored thereon is provided according to one embodiment. The portable device has a memory for storing telephone information specific to a particular geographic region. The telephone information includes telephone numbers, each of which has a name associated with it. The portable device also includes a display for displaying the stored telephone information. A user interface allows a user to select an entry from the stored telephone information. A power source provides power to the portable device. A method and computer program product for transmitting regional telephone information to a portable device are also provided. Accordingly, a connection is initiated between a portable device and a host. The portable device has a memory for storing telephone information specific to a particular geographic region. The telephone information includes telephone numbers, each of which has a name associated with it. Telephone information is transmitted from the host to the portable device and stored in the memory of the portable device.

6 Claims, 15 Drawing Sheets

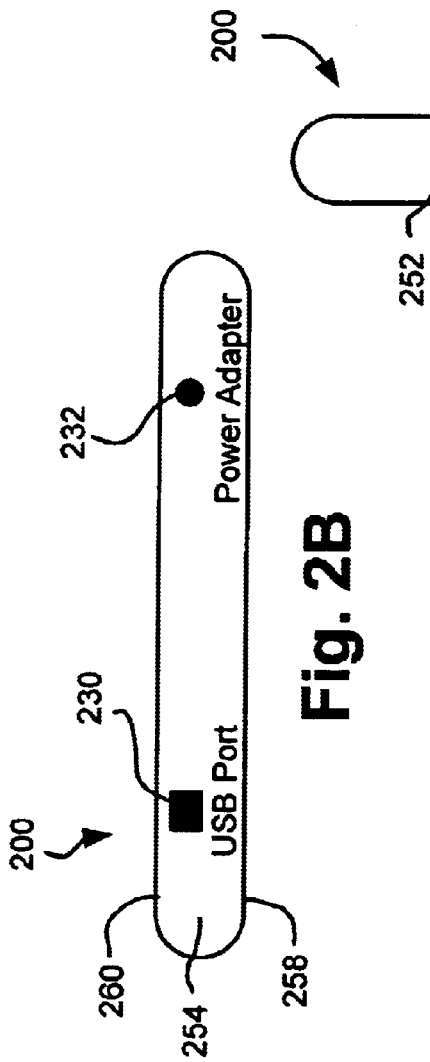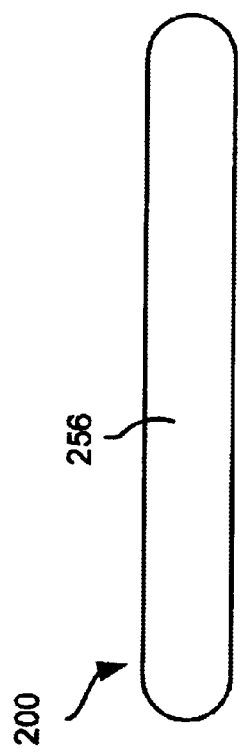

PORTABLE DEVICE FOR STORING AND SEARCHING TELEPHONE LISTINGS, AND METHOD AND COMPUTER PROGRAM PRODUCT FOR TRANSMITTING TELEPHONE INFORMATION TO A PORTABLE DEVICE

FIELD OF THE INVENTION

The present invention relates to handheld electronic devices, and more particularly to a handheld electronic device having regional telephone listings.

BACKGROUND OF THE INVENTION

For years, people have relied on the use of telephone books such as the white pages and yellow pages to find telephone numbers for persons and businesses alike. These listings are provided to telephone subscribers as part of their telephone service and are kept in the home and office. However, as society has grown more mobile, as exemplified by the proliferation of cellular and digital telephone users, the use of telephone books to find telephone numbers has become inconvenient simply because they are too bulky to carry around.

To solve this dilemma, many telephone companies now provide operator assisted directory assistance. One example is the 411 service offered by most telephone service providers. However, a fee is charged each time the service is used. Because the service is a pay-per-use type service, just a few calls can add up to a large amount fees. Thus, the costs can make use of such services prohibitive.

Less expensive methods of finding telephone listings have been developed through use of the computer. The white and yellow pages can now be searched online, and can be purchased on disc. Similar to telephone books, however, Internet and CD-ROM searches are only available when seated at a computer. Thus the mobile user is again forced to rely on expensive directory assistance. Further, CD-ROM listings become obsolete quickly and must be replaced.

As an additional drawback, telephone books are made of paper and ink. The quantity of trees that must be cut down each year to produce telephone books is staggering. Further, because of their size, telephone books take up a large quantity of room in landfills.

Thus, what is needed is a way to overcome the limitations of the prior art and eliminate the need for bulky and environmentally unfriendly telephone books, prohibitively expensive directory assistance calls, and time consuming Internet or CD-ROM phone listing searches.

SUMMARY OF THE INVENTION

A portable device having telephone information stored thereon is provided according to one embodiment. The portable device has a memory for storing telephone information specific to a particular geographic region. The telephone information includes telephone numbers, each of which has a name of a person, business, entity, etc. associated with it. The portable device also includes a display for displaying the stored telephone information. A user interface allows a user to select an entry from the stored telephone information. A power source provides power to the portable device.

As an option, the telephone information can include address information such as the street and/or mailing address of the person/business/entity listed. The telephone information can also include graphical information, which is output on the display. Preferably, at least a portion of the telephone information corresponds to a white pages listing and/or a yellow pages listing.

The geographic region can be a city and/or a metropolitan area. Further, the geographic region can be a state. In addition, the geographic region can be a country.

Preferably, the user interface includes alphanumeric keys. Also preferably, the user interface includes a scrolling mechanism for allowing a user to scroll through entries of the stored telephone information. Preferred dimensions of the portable device are: a width of less than 6 inches, a height of less than 4 inches, and a thickness of less than 1 inch.

In one embodiment, the portable device includes a processing mechanism for searching for specific portions of the telephone information based on query information input by the user via the user interface. Such query information can include business name data, business category data, and/or residence name data. The search can also be a reverse phone directory search. Ideally, the processing mechanism is dedicated to processing searches of the telephone information.

The portable device can also include an input/output (I/O) mechanism for receiving telephone information. Preferably, the input/output mechanism is capable of wireless data transmission. The portable device can also include a telephone portion capable of sending and receiving telephone calls.

A method and computer program product for transmitting regional telephone information to a portable device are also provided. Accordingly, a physical and/or wireless connection is initiated between a portable device and a host. The portable device has a memory for storing telephone information specific to a particular geographic region. The telephone information includes telephone numbers, each of which has a name of a person, business, entity, etc. associated with it. Telephone information is transmitted from the host to the portable device and stored in the memory of the portable device.

In one embodiment, the telephone information transmitted from the host to the portable device consists of only data that is different from data already stored in the memory of the portable device. Advertising information can also be transmitted to the portable device for output on the portable device. The host can be located remotely from the portable device, and the connection can include an Internet connection.

In another embodiment, the telephone information further includes graphical information, where the graphical information is output on a display of the portable device. Preferably, at least a portion of the telephone information corresponds to a white pages listing and/or a yellow pages listing. Also, the geographic region can be a city, a metropolitan area, a state, and/or a country. Preferably, a fee is charged for transmitting the telephone information to the portable device.

BRIEF DESCRIPTION OF THE DRAWINGS

FIG. 2B is a top view of the portable device of FIG. 2A.

FIG. 2C is a side view of the portable device of FIG. 2A.

FIG. 2D is a bottom view of the portable device of FIG. 2A.

DESCRIPTION OF THE PREFERRED EMBODIMENTS

Embodiments of the present invention relate to a pocket sized electronic portable device having an electronic telephone directory, and that can search for listed names, telephone numbers, and/or addresses. The portable device is preferably a handheld device amenable to being held in the palm of the hand.

Figure 1:
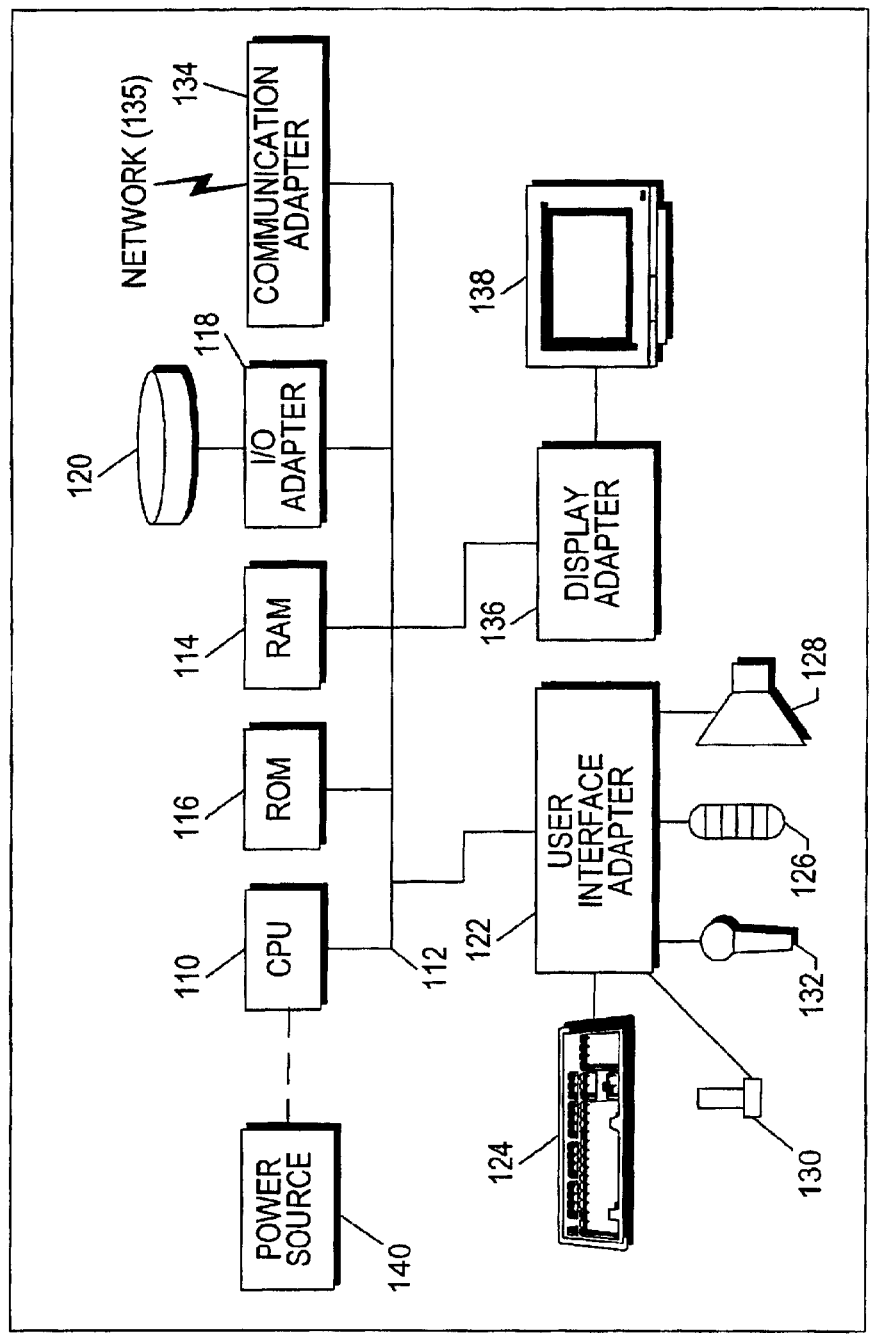
FIG. 1 illustrates a typical hardware configuration of a portable device in accordance with a preferred embodiment.

FIG. 1 illustrates an illustrative hardware configuration of a portable device 100 in accordance with a preferred embodiment having a processing mechanism 110, such as a microprocessor, and a number of other units interconnected via a system bus 112. The portable device shown in FIG. 1 includes a Random Access Memory (RAM) 114, Read Only Memory (ROM) 116 for storing telephone information, an I/O adapter 118 for connecting peripheral devices such as disk storage units 120 and/or host units (not shown) to the bus 112, a user interface adapter 122 for connecting a keyboard 124, a scrolling mechanism 126, a speaker 128, a joystick 130, a microphone 132, and/or other user interface devices such as a touch screen (not shown) to the bus 112, communication adapter 134 for connecting the workstation to a communication network (e.g., a data processing network, local area network, the Internet, etc.) and a display adapter 136 for connecting the bus 112 to a display device 138 that displays the stored telephone information. A power source 140 provides power to the portable device. The power source can be an external power source or one or more batteries (disposable and/or rechargeable).

The memory of the portable device can be an internal micro hard drive. Data can also be stored in a memory device such as the Microdrive made by IOMEGA®. The Microdrive currently has a capacity of up to 1 GB. The IOMEGA® Microdrive fits into industry standard CompactFlash Type II slots, and can be paired with a PC Card (PCMCIA Type II) Adapter for use with host computers. Where smaller amounts of memory are required, flash-type storage cards such as Iomega® CompactFlash™ cards can be used. Flash storage cards are a non-volatile storage solution that do not require a battery to retain data indefinitely. Flash storage cards are solid state, containing no moving parts. Flash cards also provide low power consumption, consuming only about five percent of the power required by small disk drives. Flash cards are currently available in the following sizes: 16 MB, 32 MB, 64 MB, 128 MB. The IOMEGA® Microdrive and CompactFlash™ cards are available from Iomega, 1821 W. Iomega Way, Roy, Utah 84067, and can be purchased from the Iomega online store at http://iomega.com/direct/main/home.jsp. Note that data compression can be used to allow more efficient storage of the telephone information in the memory.

The portable device can have resident thereon an operating system such as the Microsoft Windows CE Operating System or the Palm Operating System. Those skilled in the art will appreciate that the present invention may also be implemented on platforms and operating systems other than those mentioned.

Telephone information specific to a particular geographic region is stored in the memory of the portable device. The telephone information includes telephone numbers, each of which has a name of a person, business, entity, etc. associated with it. Such telephone information can be telephone information listed in some compilation for a particular geographic region, such as telephone information that is typically listed in a telephone directory such as the white pages of a particular telephone company. Further, the stored telephone information can be a collection of such compilations, such as a combination of all city- and metropolitan area-specific white pages listings for a particular state. One skilled in the art will appreciate that unlisted numbers may or may not be available for a portion of the telephone information.

As an option, the telephone information can include address information such as the street and/or mailing address of the person/business/entity listed. The telephone information can also include graphical information, which is output on the display. Illustrative graphical information can include pictures and advertisements found in the yellow pages for the particular entrant, etc. Preferably, at least a portion of the telephone information corresponds to a white pages listing and/or a yellow pages listing. For example, the white pages and/or yellow pages can be the listings published and/or distributed by a particular telephone company such as Pacific Bell.

The geographic region can be a city and/or a metropolitan area. For example, the region could be for the city of Los Angeles, or could include the entire Los Angeles metropolitan area. Here, the telephone information would preferably include publicly available telephone listing information for persons, businesses, etc in the city proper and/or metropolitan area. Another example of a city and metropolitan area is the city of San Francisco and the San Francisco Bay Area, respectively. Further, the geographic region can be a state such as Virginia Preferably, the telephone information would then include publicly available telephone listing information for persons, businesses, etc in the state. In addition, the geographic region can be a country such as the United States. In this case, the telephone information would preferable include publicly available telephone listing information for persons, businesses, etc in the country.

As mentioned above, the user interface includes alphanumeric keys for allowing the user to enter letters and/or numbers to add entries, perform searches, etc. The user interface also preferably includes a scrolling mechanism for allowing a user to scroll through entries of the stored telephone information. Such a scrolling mechanism can include a wheel, "up", "down", "left", "right" arrows or keys, a joystick, etc. Also, note that the entries can be organized by the portable device as a list of search results, which the user scrolls through using the scrolling mechanism.

As described above, the portable device includes a processing mechanism such as a microprocessor, ASIC, etc. for searching for specific portions of the telephone information based on query information input by the user via the user interface. Such query information can include business name data, business category data, and/or residence name data. The search can also be a reverse phone directory search. Ideally, the processing mechanism is dedicated to processing searches of the telephone information.

The portable device can also include an input/output (I/O) mechanism for receiving telephone information. This allows the device to receive new/updated telephone information, and could also be used to allow a user to import information from a personal address book. Preferably, the input/output mechanism is capable of wireless data transmission. Thus, I/O mechanism can include an Infrared (IR) port, a Radio Frequency (RF) port, a wireless networking device, a wireless modem, etc. The portable device can also include a telephone portion capable of sending and receiving telephone calls.

According to one embodiment, the microphone allows voice activation and enablement of the portable device, in turn allowing the user to issue verbal commands/queries to the portable device. For example, the user could speak into the device, stating a name to search for in a particular geographic area. Voice recognition software of a type known in the art can be used to parse and interpret the spoken query. The device would then search for the matching listing(s). The speaker can be used to audibly output the search results or other telephone information, in this and other embodiments.

Figure 2A:
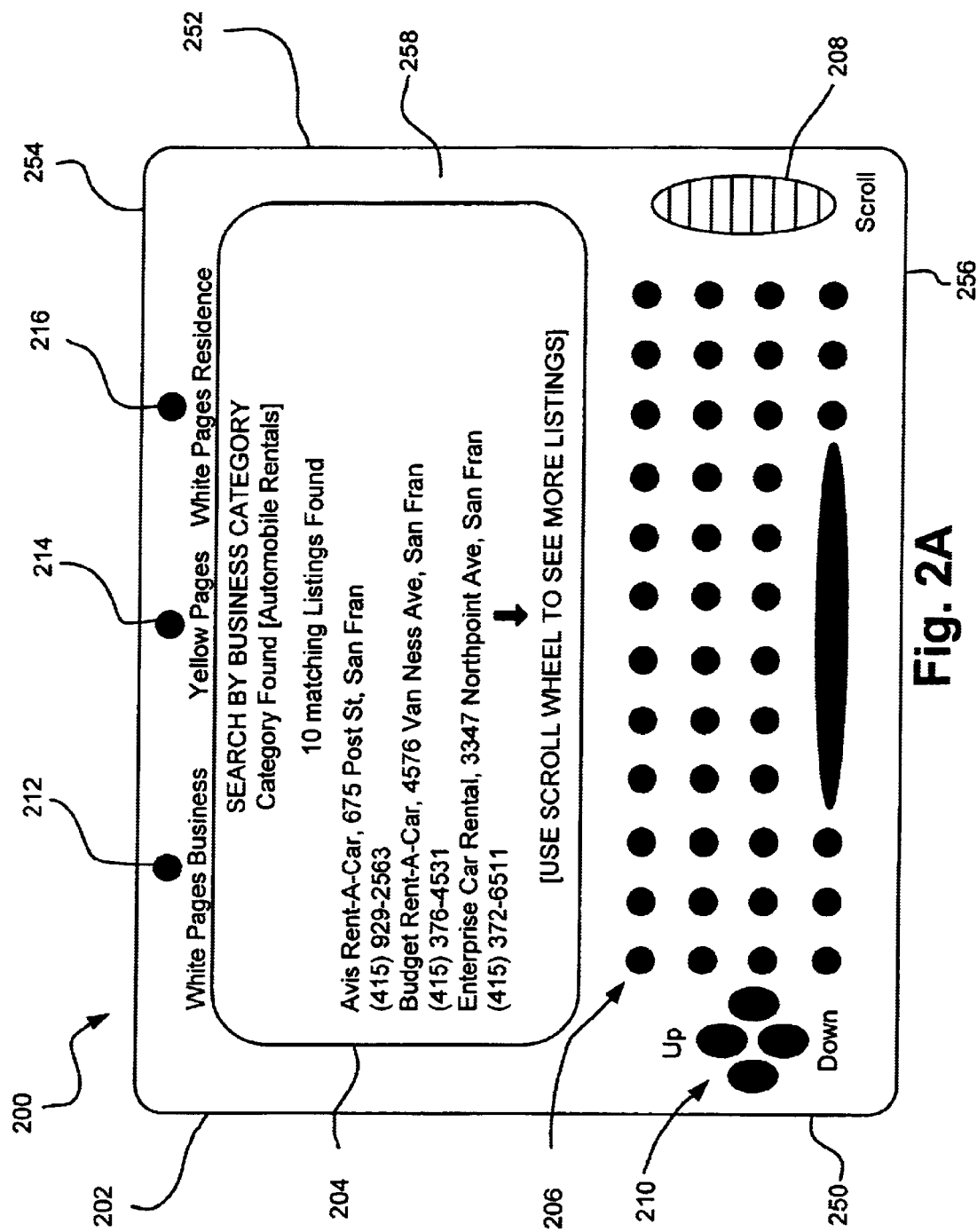
FIG. 2A is a front view of a portable device according to an illustrative embodiment.

FIG. 2A is a front view of a portable device 200 according to an illustrative embodiment. FIG. 2B is a top view of the portable device 200 of FIG. 2A. FIG. 2C is a side view of the portable device 200 of FIG. 2A. FIG. 2D is a bottom view of the portable device 200 of FIG. 2A.

As shown in FIG. 2A, the exemplary portable device includes a housing 202 which houses the electronic components of the portable device. An LCD screen 204 is positioned on the face of the portable device above an alphanumeric keypad 206, which in this example is a typewriter style keyboard. To one side of the keyboard is a scroll wheel 208. Along another side of the keyboard is up/down/left/right arrow keys 210. As an option, a buttons for initiating searches can also be included. One such button is a white pages business button 212 that initializes a search of stored listings corresponding to a white pages business directory. See the section entitled "Search by Business Name," below. A yellow pages button 214 initializes a search of stored listings corresponding to entries in a yellow pages directory. See the section entitled "Search by Business Category," below. A white pages residential button 216 initializes a search of residential listings corresponding to a white pages directory. See the section entitled "Search by Residence Name," below.

The housing of the illustrative portable device can be of a yellow translucent casing and black keys with yellow lettering to resemble the traditional yellow pages telephone directory. As shown in FIG. 2B, the top of the portable device has a USB port 230 and power/recharger plug 232 to which an external power source is detachably coupled.

Preferred dimensions of the portable device are: a width of less than about 6 inches between lateral sides 250, 252 thereof, a height of less than about 4 inches between its top and bottom edges 254, 256, and a thickness of less than about 1 inch between a front 258 and back 260 thereof. These dimensions allow the device to be held in the palm of the hand. Further, the compactness allows the user to conveniently store the device in a purse, briefcase, desk drawer etc. for transporting and/or storing the device. By way of example only, the portable device may have dimensions of 3 inches wide, $2\frac{5}{16}$ inches high and $\frac{5}{16}$ inch thick. The LCD screen in this example measures approximately $2\frac{3}{4}$ inches (as measured from screen edges parallel to the lateral sides of the device) by $1\frac{3}{8}$ inches (as measured from screen edges parallel to the top and bottom edges of the device).

Figure 3A:
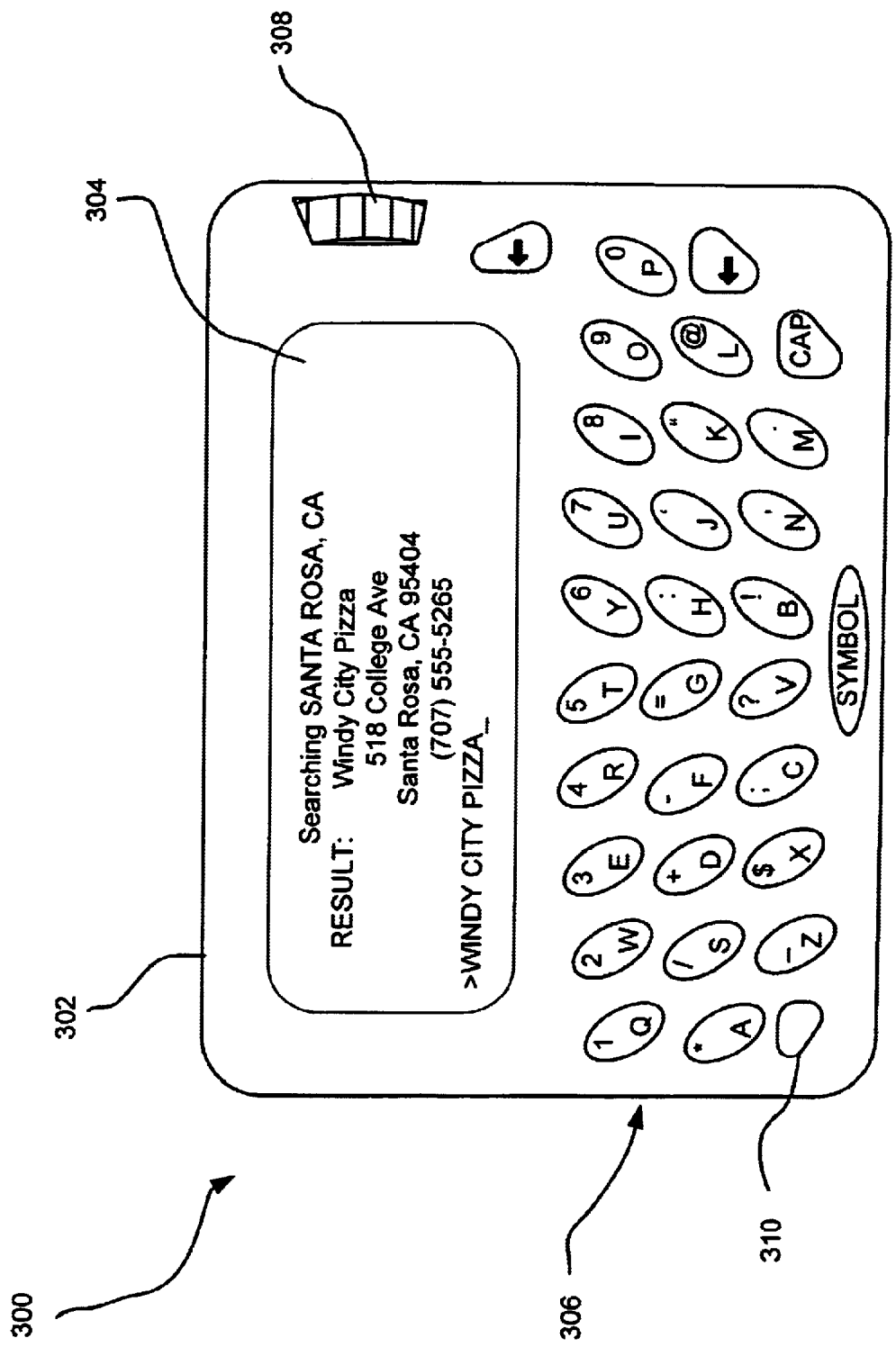
FIG. 3A is a front view of another example of a portable device according to one embodiment.

FIG. 3A shows another example of a portable device 300, again including a housing 302, a display 304, a keyboard 306, a scroll wheel 308. This embodiment also includes a shift key 310 for accessing alternate characters via the keyboard. This feature allows the keyboard to be more compact by allowing each key to represent multiple characters.

Figure 3B:
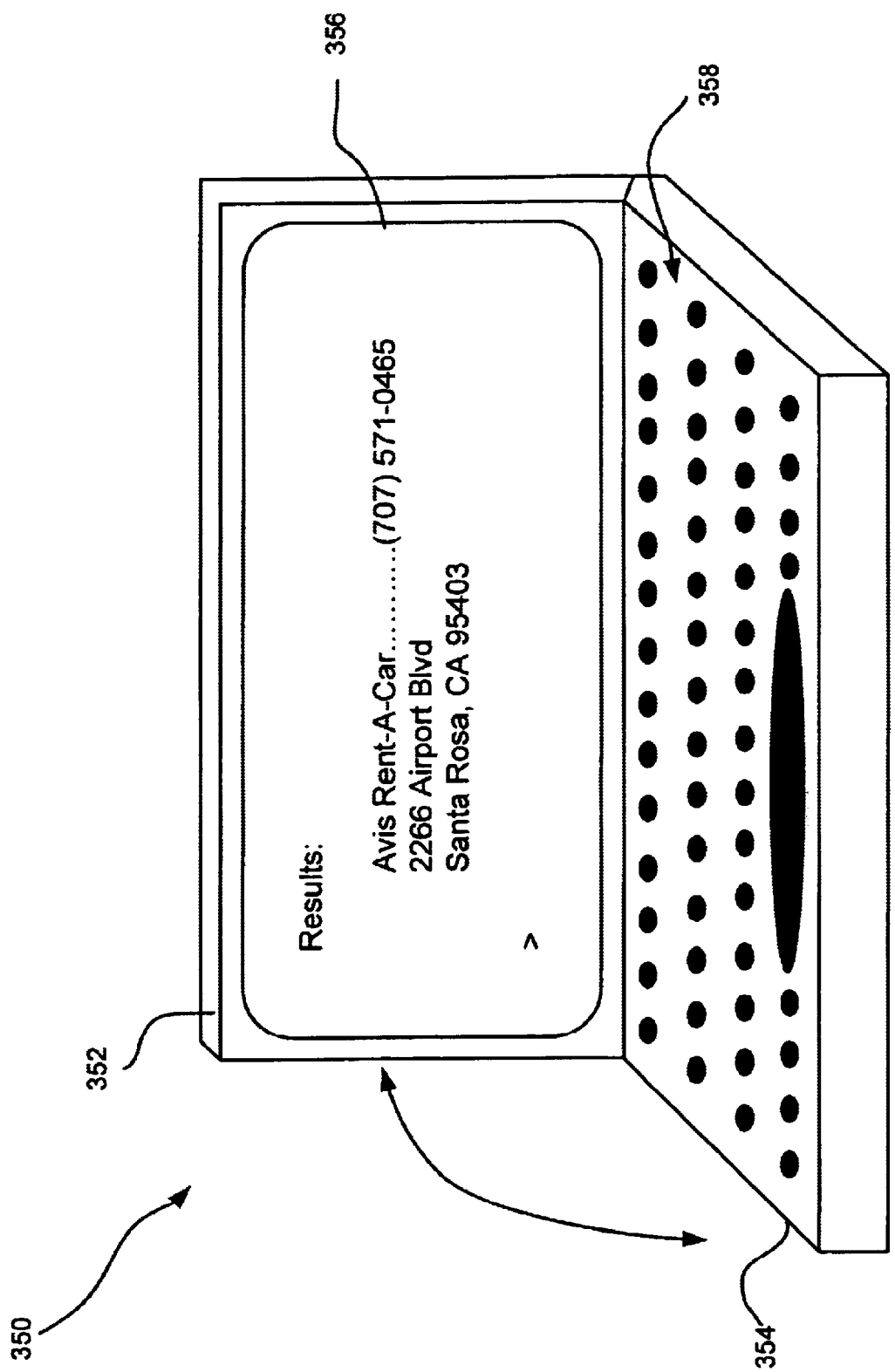
FIG. 3B is a perspective view of foldable version of a portable device in an open position according to another illustrative embodiment.

FIG. 3B is a perspective view of foldable version of the portable device 350 in an open position according to another illustrative embodiment. As shown, the portable device has first and second portions 352, 354 pivotably coupled together at rear ends thereof. The first portion has a display screen 356, while the second portion includes a user interface 358 (keyboard, wheel, scroll buttons, etc.). The first and second portions can be folded together to make the device more compact for convenient storage and transport.

The following paragraphs describe an illustrative implementation according to one embodiment. One skilled in the art will appreciate that variations and additions to the following description can be made without straying from the spirit and scope of the invention.

Figure 4:
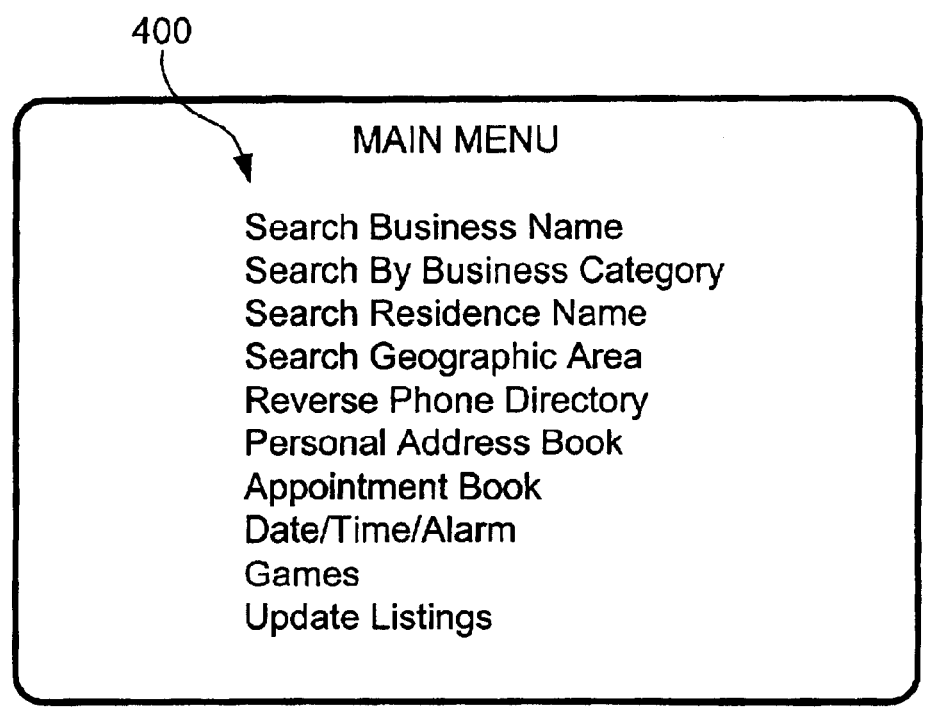
FIG. 4 depicts a main menu displayed by the portable device.

In use, the device can be turned on by tapping any key on the keyboard or by any other desired mechanism. Upon initialization of the portable device, a menu 400 is displayed on the display, as shown in FIG. 4. As shown, the menu includes the following illustrative items, each of which are described in more detail below.

Search Business Name

Search by Business Category

Search Residence Name

Search Geographic Area

Reverse Phone Directory

Personal Address Book

Appointment Book
Date/Time/Alarm
Games
Update Listings

In some cases, there may not be enough room for the menu to fully display on screen. If the menu cannot be displayed in its entirety, the user can scroll down with the scroll wheel, and use the up and down arrows to highlight and select the desired option.

Search Business Name

Figure 5:
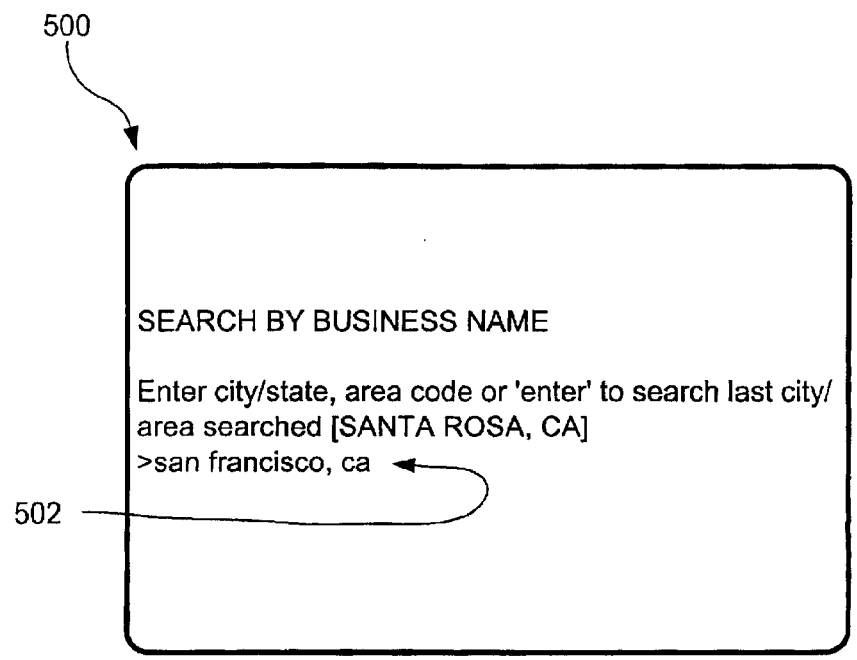
FIG. 5 illustrates a screen displayed during a search for a business name.
Figure 6:
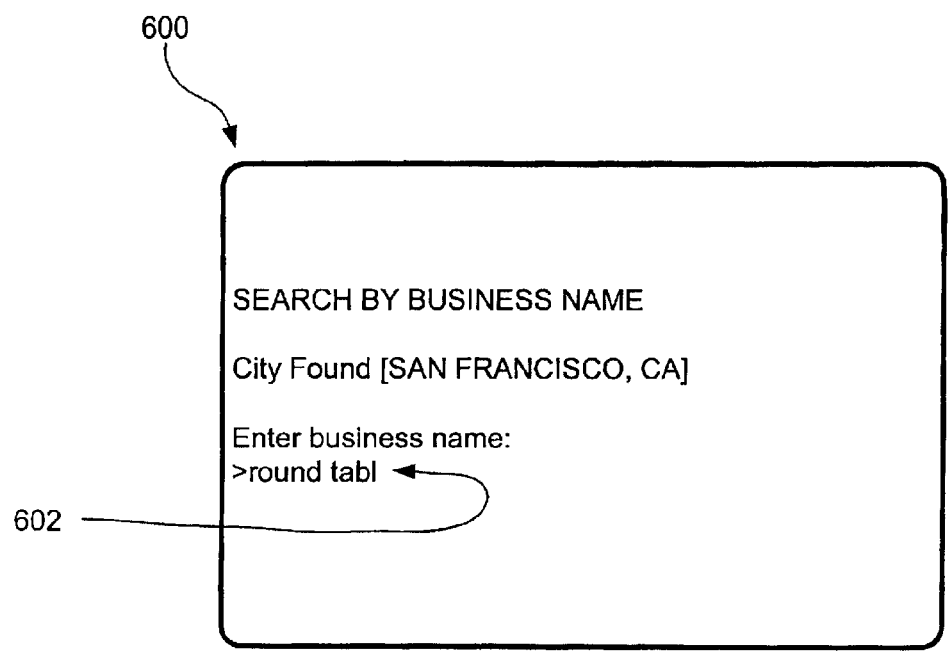
FIG. 6 illustrates another screen displayed during a search for a business name.
Figure 7:
FIG. 7 illustrates another screen displayed during a search for a business name.

If the user selects the Search Business Name option, the screen 500 shown in FIG. 5 is displayed. As shown, the device asks the user to enter either a city name, area code or gives the option to search the last city/area searched. The user then types in the city name 502. If city name is typed exactly, the device will then state, for example "Will search Santa Rosa, Calif." As shown in the screen 600 of FIG. 6, the user can proceed to type the full or partial name 602 of the business that he or she wishes to search for. If a partial city name is typed or the city name is typed inaccurately, then a list of possible matching cities appears. The user selects the city that he wants to search from the list and can then proceed to type the name of the business that he wishes to search for. The user can type a whole or partial name to search for. If the business name is typed exactly and found, the name, address and phone number are automatically displayed. If the name is not typed exactly as listed, a list of similar matches is presented. FIG. 7 shows a screen 700 displaying the list of results 702 for the query "round tabl" of FIG. 6. The user can scroll up and down the list with the scroll wheel. If the user finds the desired listing on the list of matches, he can then select the match from the list by highlighting it with the arrow keys and selecting the "enter" key. The name, address and phone number are then displayed on the screen. If no listing is found, the portable device gives the option to search surrounding cities.

Search by Business Category

Figure 8:
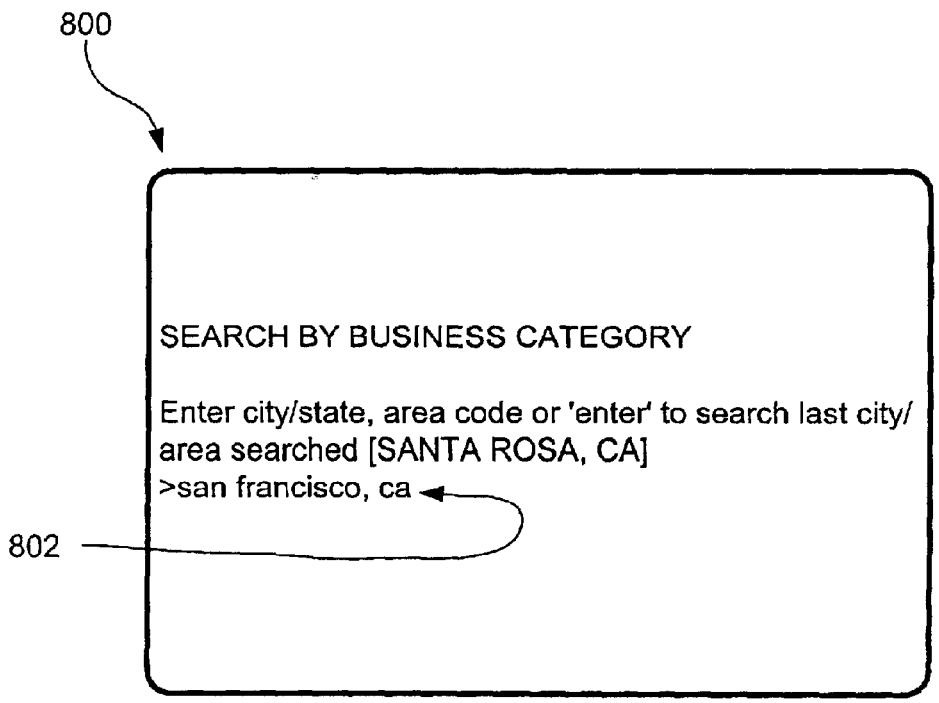
FIG. 8 illustrates a screen displayed during a search for a business by category.
Figure 9:
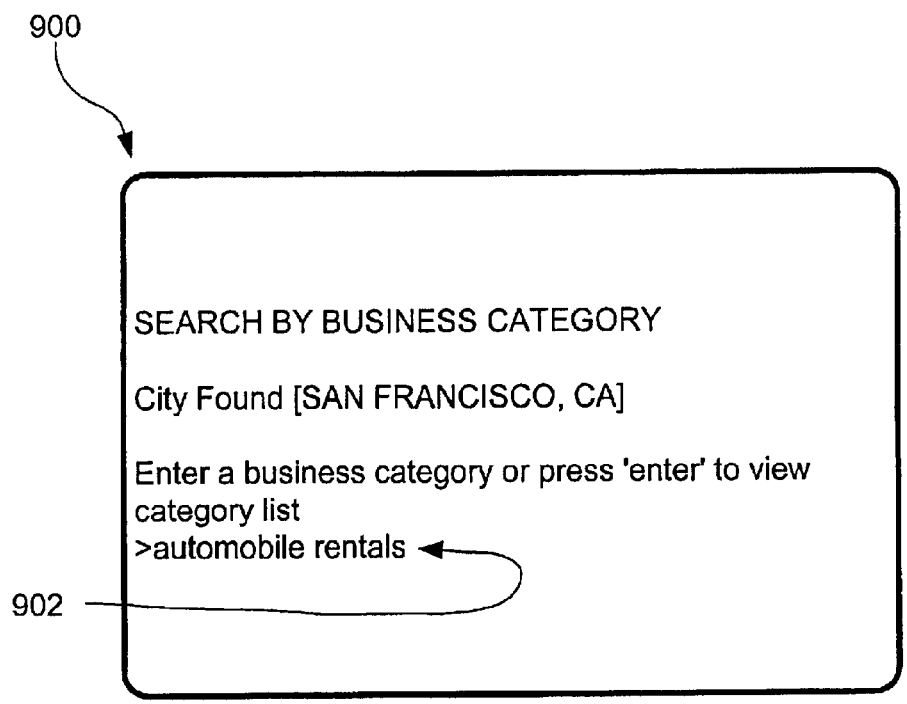
FIG. 9 illustrates another screen displayed during a search for a business by category.
Figure 10:
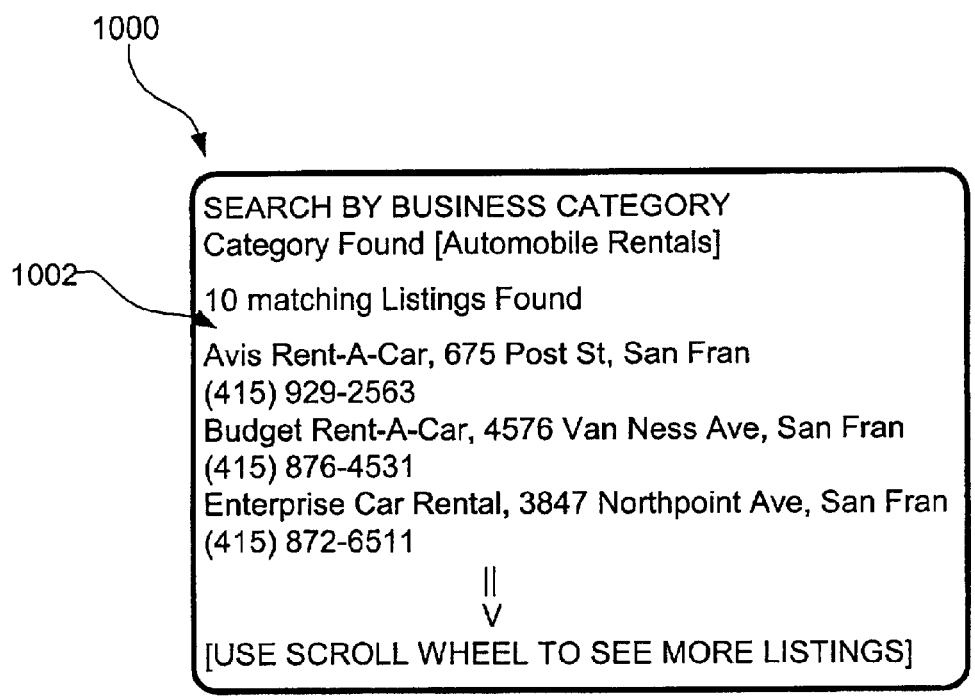
FIG. 10 illustrates another screen displayed during a search for a business by category.

If the user selects the "Search Business Category" (yellow pages) option, the screen 800 shown in FIG. 8 is displayed. As depicted, the device asks the user to enter either a city name, area code or gives the option to search the last city/area searched. The user then types in the city name 802. As shown in the screen 900 of FIG. 9, the device then asks the user to select a category from the Main Category List, such as, "Automobiles" or "Restaurants", etc. The user can also type the category name 902, as shown. If the user decides to search from the Category List, once she chooses a Main Category, she selects a subcategory, such as, "Automobile—Rentals." If the user chooses to type the category name, if the category is typed exactly, then category phone listings are displayed. However, if the category is typed inaccurately, a list of possible matching categories is displayed. The user can then select the desired category, and the phone listings 1002 for the selected category are output, as shown in the screen 1000 of FIG. 10. Certain listings from paid advertisers can be larger and more graphical in nature, and are preferably similar to display advertisements in the yellow pages of phone books.

Search Residence Name

If the user selects the Search Residence Name option, the device asks the user to enter either a city name, area code, or gives the option to search the last city/area searched, in a similar way to that described above. If the city name is typed exactly, the device states, for example, "Will search Santa Rosa, Calif.," and then the user can proceed to type the name of the person he wishes to search for. If a partial city name is typed or the city name is typed inaccurately, then a list of possible cities appears and the user selects the city that he wants to search from the list. The user proceeds to type the name of the person that they wish to search for. The user can type a whole or partial name to search. If a name is typed exactly and found, the name, address and phone number are displayed. If the name is not typed exactly as listed, a list of similar matches appears. The user can scroll up and down the list with the scroll wheel. If user finds the desired listing on the list of matches, he can then select the match from the list by highlighting it with the arrow keys and hitting "enter." Then the name, address and phone number are displayed on the screen. If no listing is found, the device provides the option to Search Surrounding Cities.

Search by Geographic Area

Figure 11:
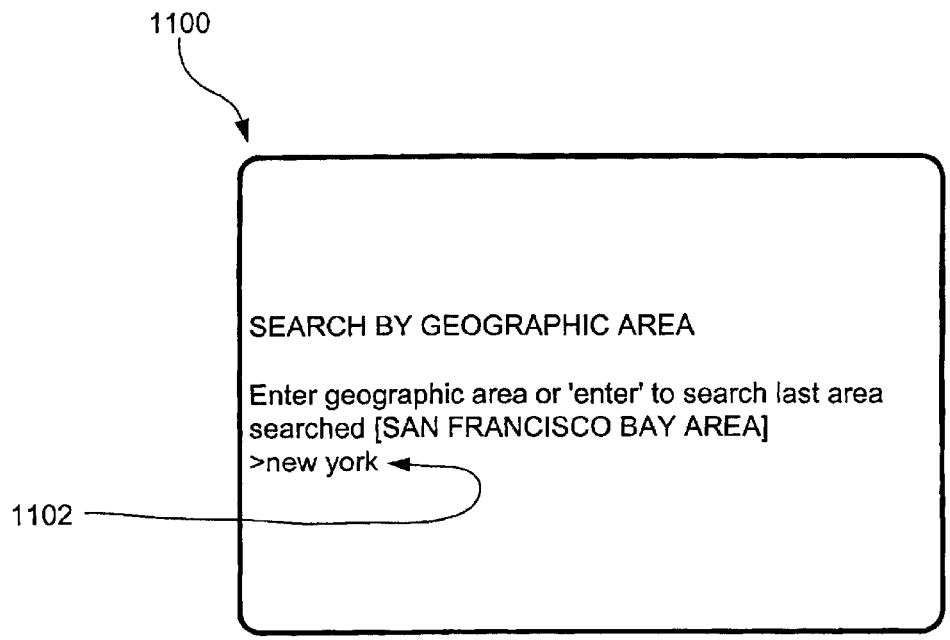
FIG. 11 illustrates a screen displayed during a search for a telephone number by geographic area.
Figure 12:
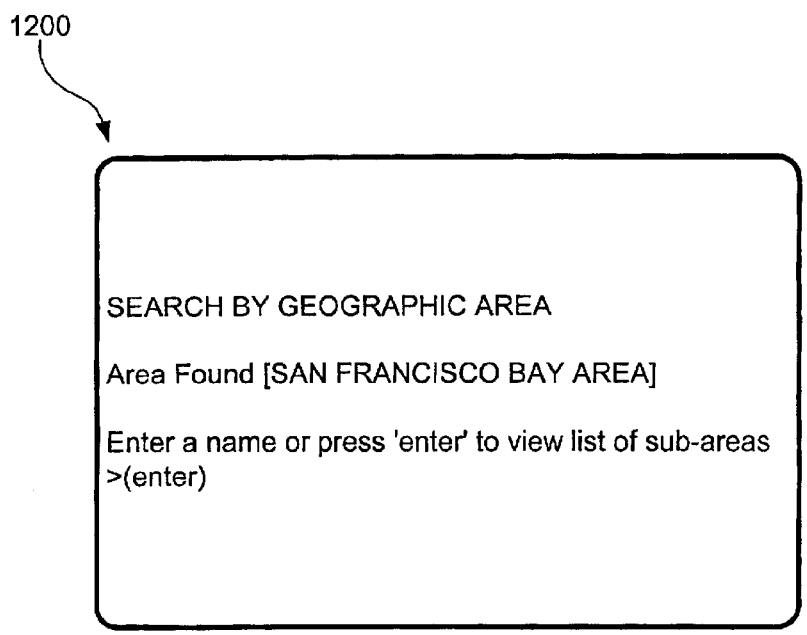
FIG. 12 illustrates another screen displayed during a search for a telephone number by geographic area.
Figure 13:
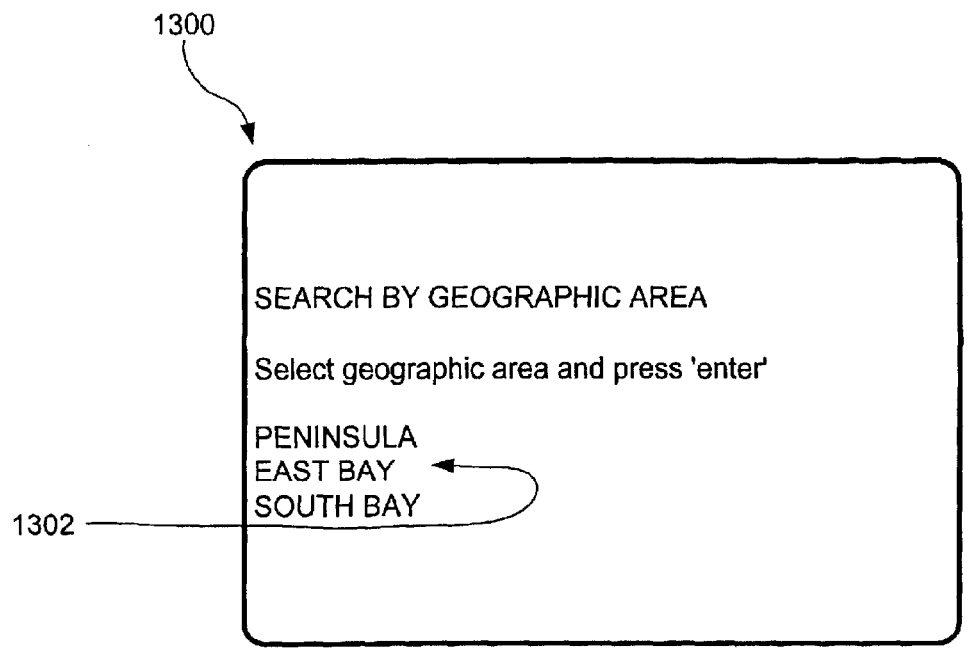
FIG. 13 illustrates another screen displayed during a search for a telephone number by geographic area.
Figure 14:
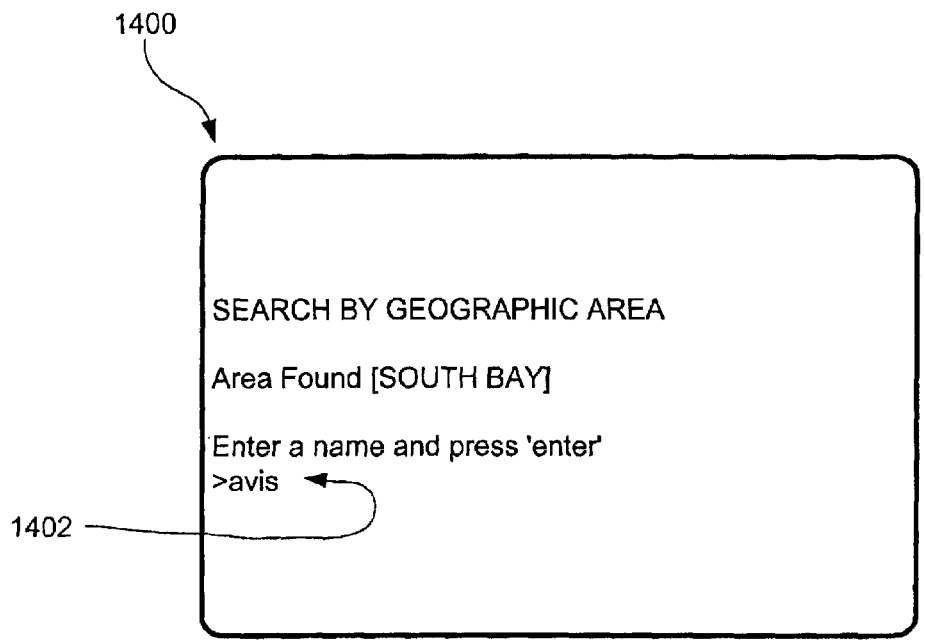
FIG. 14 illustrates another screen displayed during a search for a telephone number by geographic area.
Figure 15:
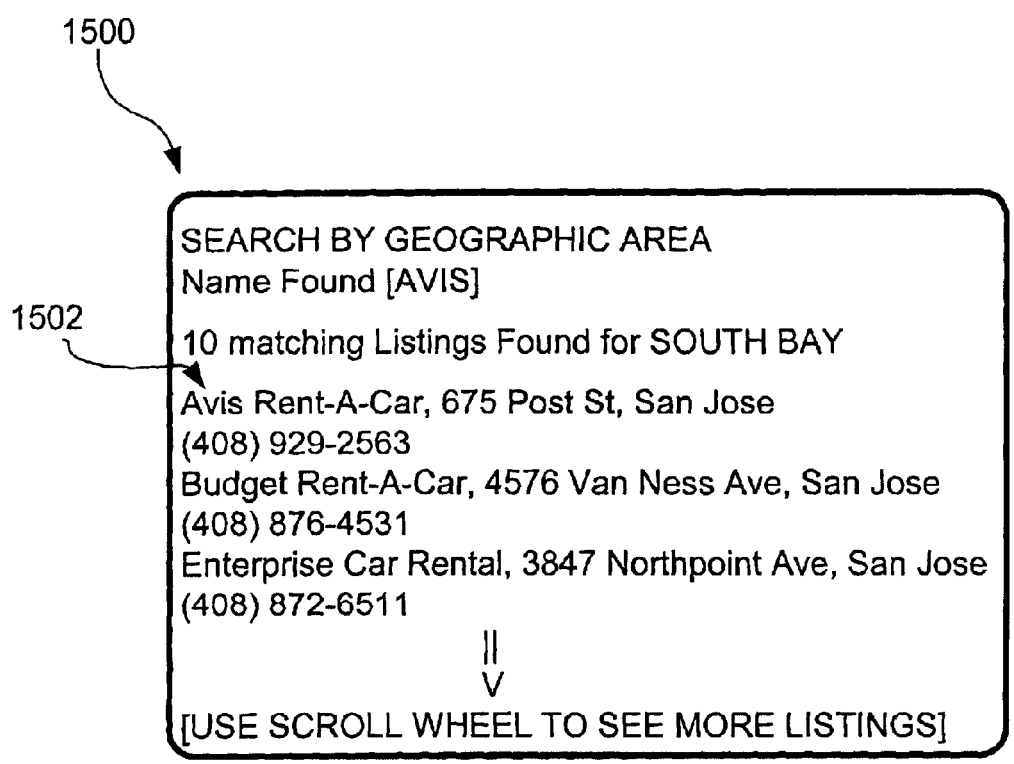
FIG. 15 illustrates another screen displayed during a search for a telephone number by geographic area.

If the user selects the "Search Geographic Area" option, the screen 1100 shown in FIG. 11 is displayed. As depicted, the device asks the user to enter either a geographic area (city, metropolitan area, state, country, etc.) or gives the option to search the last geographic area searched. The user then types in the desired area 1102. As shown in the screen 1200 of FIG. 12, the device then asks the user to select a category from the Main Category List, such as, "Peninsula," "East Bay," "South Bay", etc. or enter the name to search for in the full geographic area. The user can also type the category name. If the user decides to search from the Category List, once she chooses a Main Category, she selects a subcategory, such as, "South Bay," as shown in FIG. 13, which shows a list 1300 of subcategories. In the screen 1400 of FIG. 14, the user then enters the name 1402 to search for in the geographic area. A list 1502 of possible matching categories is displayed on the screen 1500, as shown in FIG. 15. The user can then select the desired category, and then view phone listings for the selected category.

Reverse Phone Directory

The portable device can also perform reverse searching. The device asks for an area code and phone number. If a listing is found with a matching phone number, the name and address associated with that telephone number are displayed. This feature allows a user to, for example, verify that the number he has is correct.

Personal Address Book. Appointment Book, Date/Time/Alarm & Games

The portable device can, as an option, also include other bonus features including the ability to add names and addresses (for friends and associates who are unlisted). Further, the device can download contact information from an address book on the user's host system. Other optional features include a calendar, an appointment book, an alarm clock, and various games. One skilled in the art will know how to add these optional features to the portable device and therefore no additional description will be provided.

Update Listings

Figure 16:
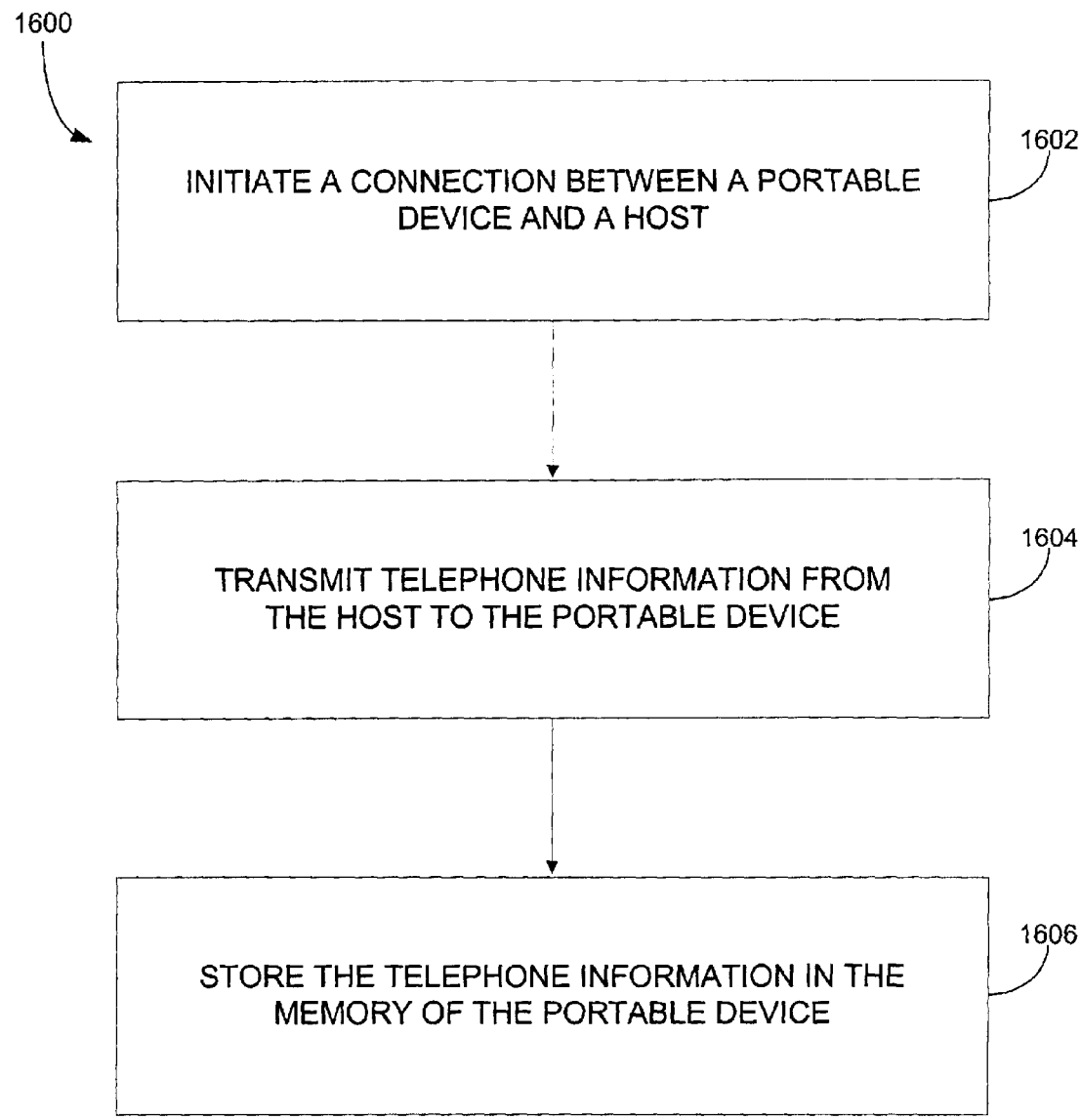
FIG. 16 is a flow diagram of a process for transmitting regional telephone information to a portable device.

FIG. 16 is a flow diagram of a process 1600 for transmitting regional telephone information to a portable device. In operation 1602, a physical and/or wireless connection is initiated between a portable device and a host. The portable device has a memory for storing telephone information specific to a particular geographic region. The telephone information includes telephone numbers, each of which has a name of a person, business, entity, etc. associated with it. Telephone information is transmitted from the host to the portable device in operation 1604, and in operation 1606, is stored in the memory of the portable device.

In one embodiment, the telephone information transmitted from the host to the portable device consists of only data that is different from data already stored in the memory of the portable device. This allows fast updating of the telephone information without requiring that the entire listing be resent to the portable device. Advertising information can also be transmitted to the portable device for output on the portable device. The host can be located remotely from the portable device, and the connection can include an Internet connection.

In another embodiment, the telephone information further includes graphical information, where the graphical information is output on a display of the portable device. Preferably, at least a portion of the telephone information corresponds to a white pages listing and/or a yellow pages listing. Also, the geographic region can be a city, a metropolitan area, a state, and/or a country. Preferably, a fee is charged for transmitting the telephone information to the portable device.

Figure 17:
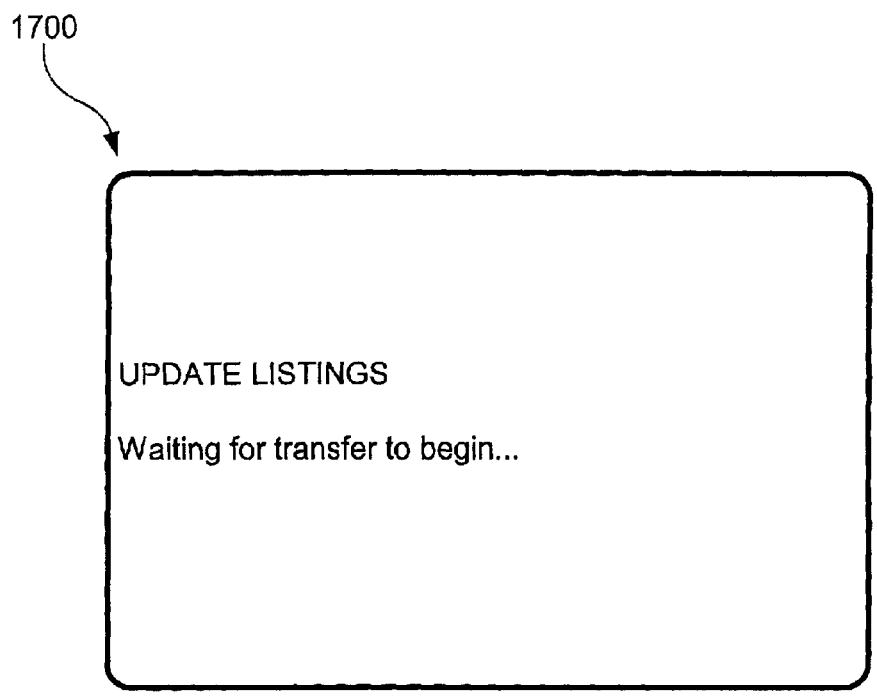
FIG. 17 depicts a screen displayed on the portable device showing the status of a transfer of telephone information thereto.
Figure 18:
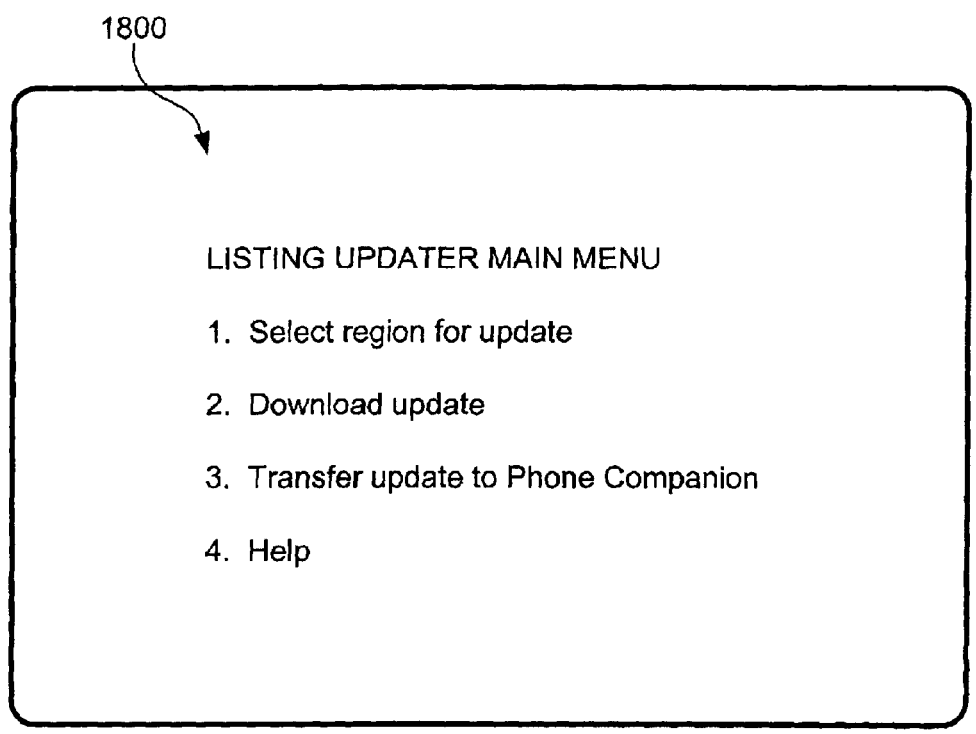
FIG. 18 illustrates the main menu of listing updater software as displayed on a host system.

Inexpensive semi-annual updates can be received by interfacing the device to a home computer via its USB port and logging onto the Internet. In an example of use, the user connects the portable device to a host computer (PC/Mac/ etc.) via the USB port 230 or via any other type of connection that allows data transfer therebetween. See FIG. 2B. The user selects the "Update Listings" option from the main menu 400 on the portable device. See FIG. 4. The screen 1700 of FIG. 17 is displayed, showing a status of the transfer. A one time installation of a listing updater software program is installed on the host computer. FIG. 18 illustrates the main menu 1800 of the listing updater software as displayed on the host system. The user can log onto the Internet, such as through an Internet Service Provider (ISP), and download the "listing updater" software from a remote site. Using this computer program the user then selects the geographical region (city, state, country, etc.) for which she is updating the telephone information, and then she selects "Download Update Now." The computer downloads the update from the remote site. Once the download is complete, the computer returns to the main menu, and the user then selects "Transfer most recent update to Phone Companion." The computer preferably searches for and identifies the most recent "Update File" on its hard drive and begins transferring the updated listings to the portable device. The transfer preferably will not begin until the user activates the "Update Listings" option from the main menu 400 on the portable device. See FIG. 4.

As another option, the updates can be obtained on disk, CD, DVD-ROM or other suitable medium and transferred to the portable device. For example, updates on portable media can be purchased, delivered to a user via a delivery service, etc.

As a further option, updates can be downloaded at a (contracted) computer store, kiosk, vending machine, etc. The user may be required to pay a fee to have the telephone information on the device updated. The update may also be provided free of charge as part of a promotion and/or in exchange for allowing display of advertising on the portable device.

Updates can also be retrieved from a remote site or host via a wireless modem coupled to (integrated with or connected to) the portable device. Note that in any of the embodiments described above, the updates can be presented periodically, such as when a white pages listing and/or yellow pages listing are published by a telephone company.

According to another embodiment, the memory can also be removed, coupled to the host computer, and updated directly. The memory is then recoupled to the portable device. Flash memory, described above, can be used in such embodiments, for example.

As a further example, a device can be coupled to a telephone system, such as via a conventional telephone cable and wall jack. The updates can be downloaded via the telephone system from a remote provider. In this embodiment, the device may or may not be portable.

Figure 19:
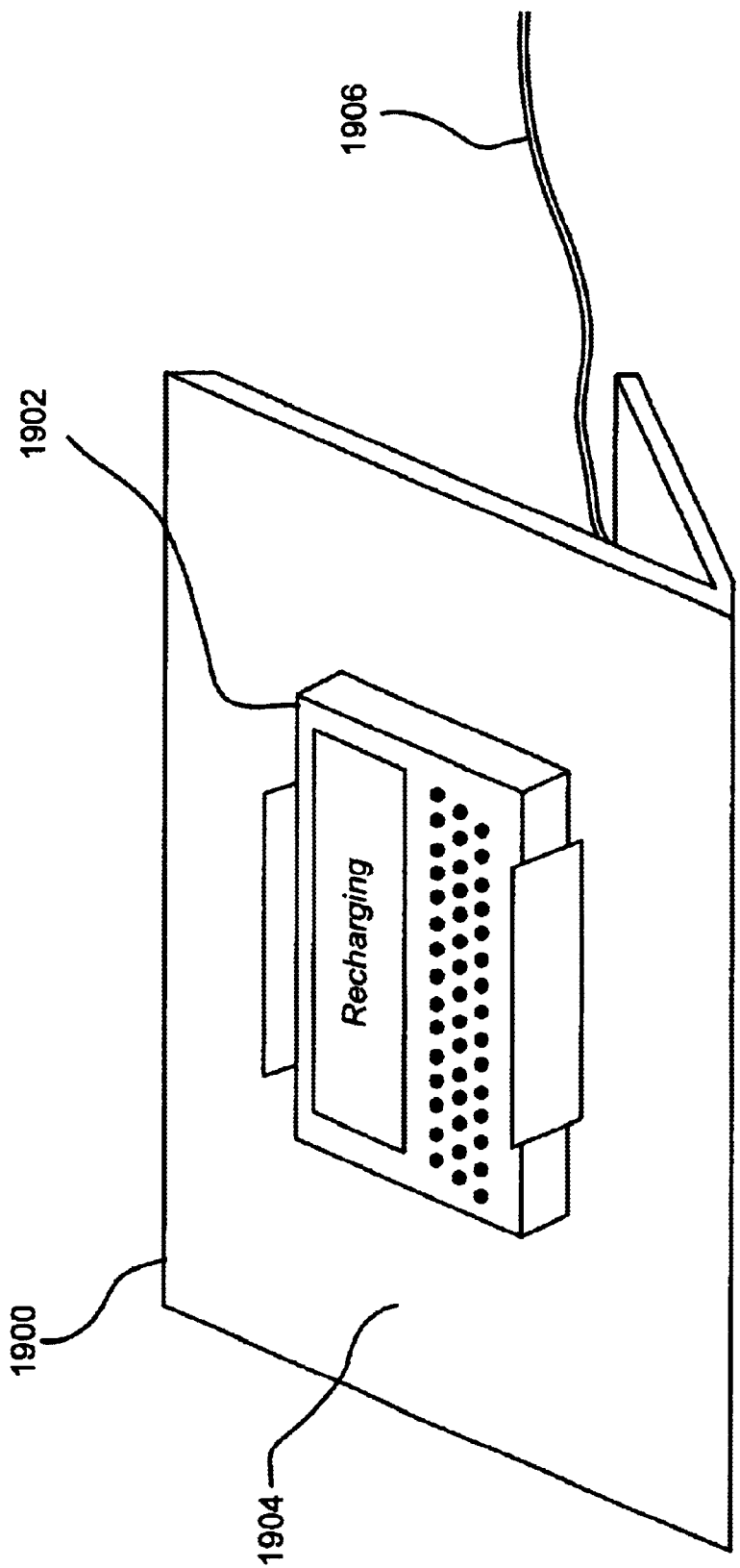
FIG. 19 is a perspective view of a charging stand for a portable device according to one embodiment.

FIG. 19 is a perspective view of a charging stand 1900 for a portable device 1902 according to one embodiment. The charging stand includes electrical contacts (not shown) that couple to the portable device for recharging the power source of the portable device. As shown, the charging stand preferably has an angled face 1904 to which the portable device is mounted so that the portable device is accessible and visible when in the charging stand. The charging stand is coupled to an external power source via an electrical cord 1906. The charging stand allows the portable device to be conveniently located near a telephone.

In another embodiment, the portable device can be coupled to a telephone. In such an embodiment, the desired telephone number can be found by performing a search as described above. Then, a command can be entered to automatically dial a telephone number retrieved by the search. In a similar embodiment, a unit for recharging the power source of the portable device can be coupled to a telephone. When the portable device is coupled to the charger, telephone numbers can be searched for and retrieved, and automatically dialed, as described above.

While various embodiments have been described above, it should be understood that they have been presented by way of example only, and not limitation. Therefore, the breadth and scope of a preferred embodiment should not be limited by any of the above-described exemplary embodiments, but should be defined only in accordance with the following claims and their equivalents.

What is claimed is:

1. A portable device having telephone information stored thereon, comprising:

(a) a memory storing telephone information specific to a particular geographic region;

(b) wherein the telephone information includes telephone numbers, each of the telephone numbers having a name associated therewith;

(c) wherein the telephone information further includes address information;

(d) wherein the telephone information further includes locally stored graphical information including advertising information, wherein the graphical information is output on the display, wherein a fee is charged for inclusion of the advertising information in the telephone information;

(e) wherein at least a portion of the telephone information corresponds to at least one of a white pages listing and a yellow pages listing;

(f) wherein the geographic region is at least one of a city, a metropolitan area, a state, and a country;

(g) a display for displaying the stored telephone information;

(h) alphanumeric keys for entering query information for searching the stored telephone information;

(i) a scrolling mechanism for allowing a user to scroll through consecutive entries of the stored telephone information;

(j) a processing mechanism for searching for specific portions of the telephone information based on the query information input by the user via the alphanumeric keys, wherein the processing mechanism is dedicated to processing searches of the telephone information;

(k) wherein the query information includes at least one of business name data, business category data, and residential name data; and (l) an input/output mechanism for receiving updated telephone information;

(m) a power source;

(n) wherein the portable device has a width of less than 6 inches, a height of less 4 inches, and a thickness of less than 1 inch.

2. The portable device as recited in claim 1, wherein the portable device only stores telephone information.

3. The portable device as recited in claim 1, wherein user input to the portable device is limited to selection of the telephone information.

4. The portable device as recited in claim 1, wherein the search is a reverse phone directory search.

5. The portable device as recited in claim 1, wherein the input/output mechanism is capable of wireless data transmission.

6. The portable device as recited in claim 1, further comprising a telephone portion capable of sending and receiving telephone calls.

* * * * *